US010706286B1

(12) United States Patent
Muhamed et al.

(10) Patent No.: US 10,706,286 B1
(45) Date of Patent: Jul. 7, 2020

(54) 3D CONVOLUTIONAL NEURAL NETWORKS FOR TELEVISION ADVERTISEMENT DETECTION

(71) Applicant: Alphonso Inc., Mountain View, CA (US)

(72) Inventors: Aashiq Muhamed, Mountain View, CA (US); Susmita Ghose, Mountain View, CA (US); Dawnis Chow, Santa Clara, CA (US)

(73) Assignee: Alphonso Inc., Mountain View, CA (US)

( * ) Notice: Subject to any disclaimer, the term of this patent is extended or adjusted under 35 U.S.C. 154(b) by 0 days.

(21) Appl. No.: 16/752,223

(22) Filed: Jan. 24, 2020

Related U.S. Application Data

(60) Provisional application No. 62/896,170, filed on Sep. 5, 2019.

(51) Int. Cl.
*G06K 9/62* (2006.01)
*G06N 3/08* (2006.01)
(Continued)

(52) U.S. Cl.
CPC ....... *G06K 9/00718* (2013.01); *G06K 9/6269* (2013.01); *G06K 9/6277* (2013.01);
(Continued)

(58) Field of Classification Search
CPC ............. G06K 9/00718; G06K 9/6269; G06K 9/6277; G06N 20/20; G06N 20/10; G06N 3/0454
See application file for complete search history.

(56) References Cited

U.S. PATENT DOCUMENTS 8,345,984 B2 1/2013 Ji et al.
9,330,171 B1 * 5/2016 Shetty ...................... G06T 3/00
(Continued)

OTHER PUBLICATIONS

Kay et al., "The Kinetics Human Action Video Dataset," Downloaded from web page: https://arxiv.org/pdf/1705_06950.pdf, May 19, 2017, 22 pages.
(Continued)

*Primary Examiner* — Santiago Garcia
(74) *Attorney, Agent, or Firm* — Panitch Schwarze Belisario & Nadel LLP

(57) ABSTRACT

A method is provided to classify whether video content is likely to be an advertisement or a non-advertisement. A curated database of video content items that includes a plurality of different video content items that were each previously identified as being an advertisement, and a plurality of different video content items that were each previously identified as not being an advertisement, are used to train a 2D CNN and a 3D CNN. The training of the 2D CNN includes learning characteristic visual and spatial features of advertisement images in the video content items compared to non-advertisement images in the video content items, the training resulting in weights being defined for the 2D CNN. The training of the 3D CNN includes learning a temporal structure and relationship over multiple image frames of the advertisements in the video content items compared to non-advertisement image frames in the video content items, the training resulting in weights being defined for the 3D CNN. The trained 2D CNN and 3D CNN are then used to determine the probability that newly identified video content should be classified as an advertisement.

9 Claims, 5 Drawing Sheets

Linear flowchart for aggregated audio and video

(51) Int. Cl.

| | |
|---|---|
| ***H04N 21/439*** | (2011.01) |
| ***H04N 21/44*** | (2011.01) |
| ***G06K 9/00*** | (2006.01) |
| ***G06N 20/10*** | (2019.01) |
| ***G06N 20/20*** | (2019.01) |
| ***H04N 21/466*** | (2011.01) |
| ***G06N 3/04*** | (2006.01) |

(52) U.S. Cl.

CPC ............. *G06N 3/0454* (2013.01); *G06N 3/08* (2013.01); *G06N 20/10* (2019.01); *G06N 20/20* (2019.01); *H04N 21/439* (2013.01); *H04N 21/44008* (2013.01); *H04N 21/4665* (2013.01)

(56) References Cited

U.S. PATENT DOCUMENTS

| | | | | |
|---|---|---|---|---|
| 9,858,484 | B2 * | 1/2018 | Tran | G06K 9/00744 |
| 10,402,697 | B2 * | 9/2019 | Yang | G06K 9/00711 |
| 2018/0032846 | A1 * | 2/2018 | Yang | G06K 9/00711 |
| 2018/0101752 | A1 * | 4/2018 | Chen | G06K 9/6268 |
| 2018/0373985 | A1 * | 12/2018 | Yang | G06N 3/0445 |
| 2019/0180142 | A1 * | 6/2019 | Lim | G06N 3/02 |
| 2019/0251340 | A1 * | 8/2019 | Brown | G06N 3/08 |
| 2019/0392487 | A1 * | 12/2019 | Duke | G06N 3/04 |
| 2020/0005061 | A1 * | 1/2020 | Lu | G06K 9/00369 |
| 2020/0042833 | A1 * | 2/2020 | Toor | G06N 3/084 |
| 2020/0042864 | A1 * | 2/2020 | Nguyen | H04W 84/18 |

OTHER PUBLICATIONS

Prabhu, Raghav, "Understanding of Convolutional Neural Network (CNN)—Deep Learning." Downloaded from web page: https://medium.com/@RaghavPrabhu/understanding-of-convolutional-neural-network-cnn-deep-learning-99760835f148, download date: Jun. 27, 2019, original posting date: unknown, 7 pages.

Wikipedia entry for Rectifier (neural networks). Downloaded from web page: https://en.m.wikipedia.org/wikiRectifier (neural_networks), download date: Jun. 12, 2019, original posting date: unknown, 5 pages.

Wikipedia entry for "Softmax function," Downloaded from web page: https://en.wikipedia.org/w/index.php?title=Softmax_function&oldid=896581685, download date: May 11, 2019, original posting date: unknown, 7 pages.

Zolfaghari et al., "ECO: Efficient Convolutional Network for Online Video Understanding," and Supplementary Material, University of Freiburg, May 2018, 24 pages.

Andrej Karpathy et al. "Large-scale Video Classification with Convolutional Neural Networks." Proceedings of the 2014 IEEE Conference on Computer Vision and Pattern Recognition, Jun. 2014, pp. 1725-1732 (downloaded from: <https://cs.stanford.edu/people/karpathy/deepvideo/deepvideo_cvpr2014.pdf>, download date: Apr. 3, 2020).

* cited by examiner

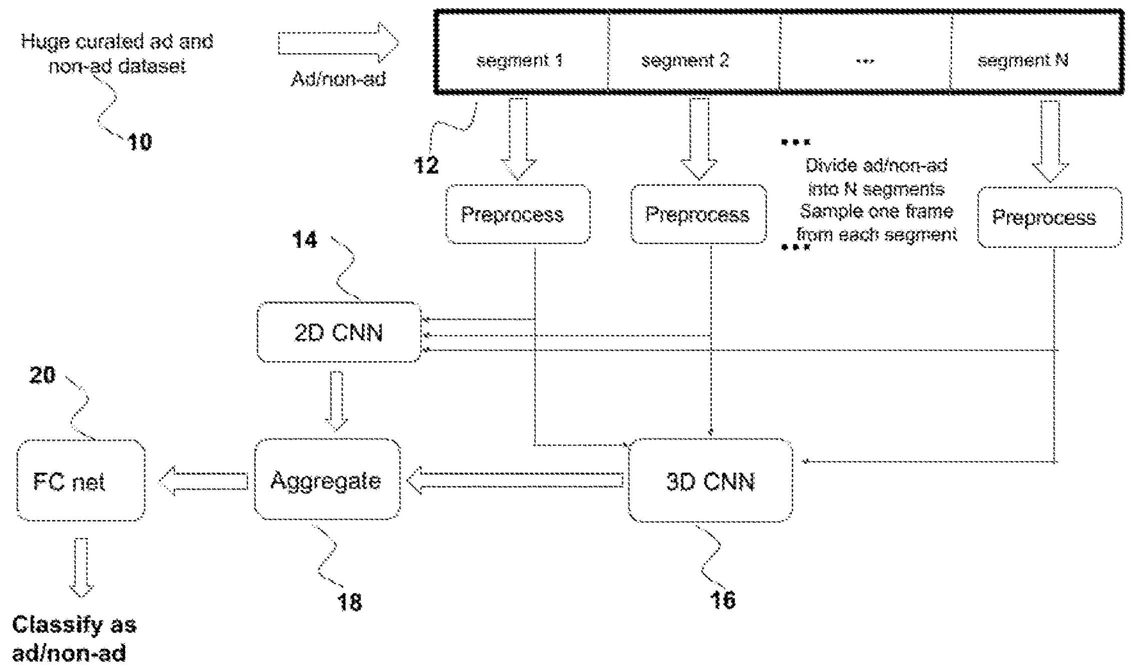
Fig.1: Ad-detection architecture
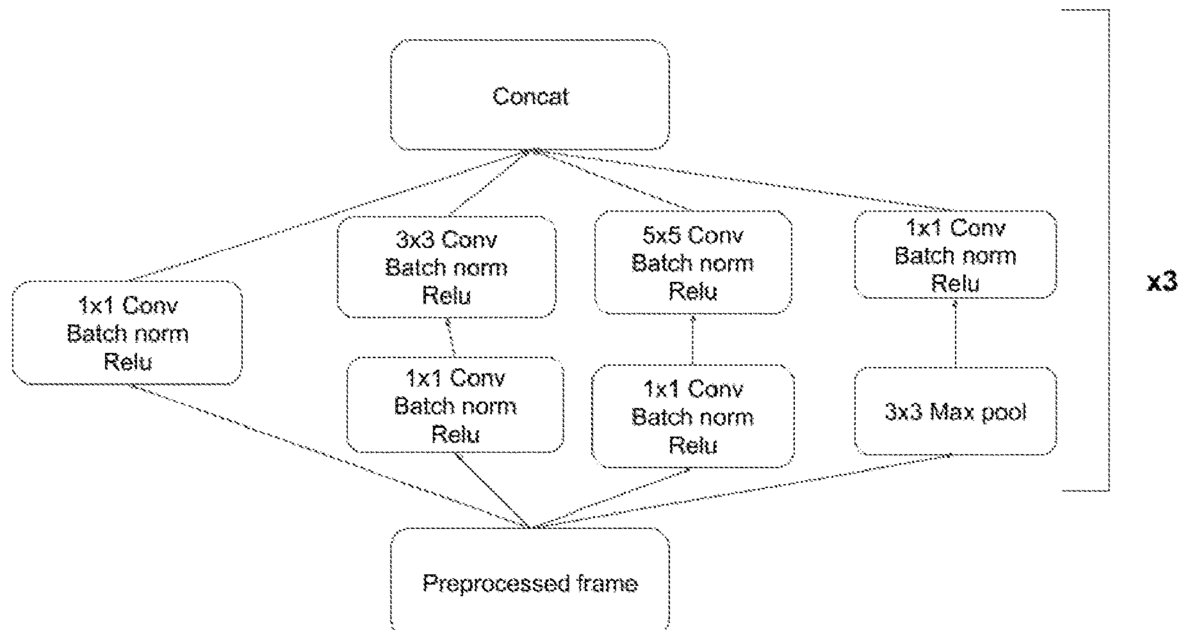
Fig. 2: Video 2D CNN

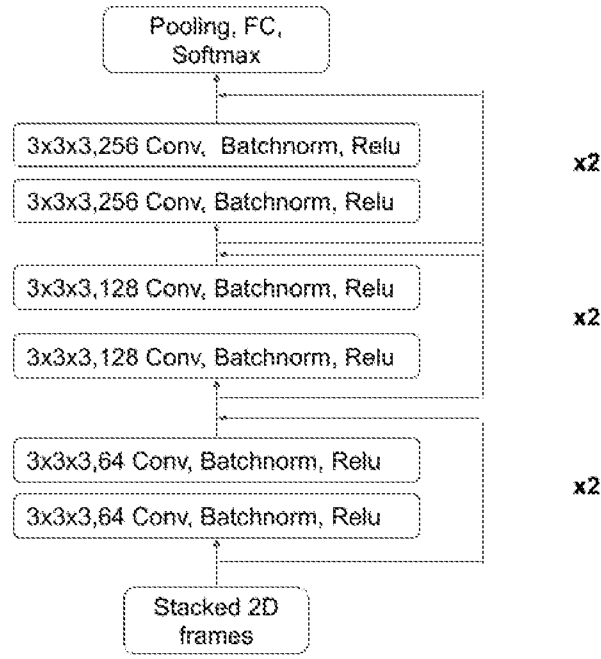
Fig. 3: Video 3D CNN
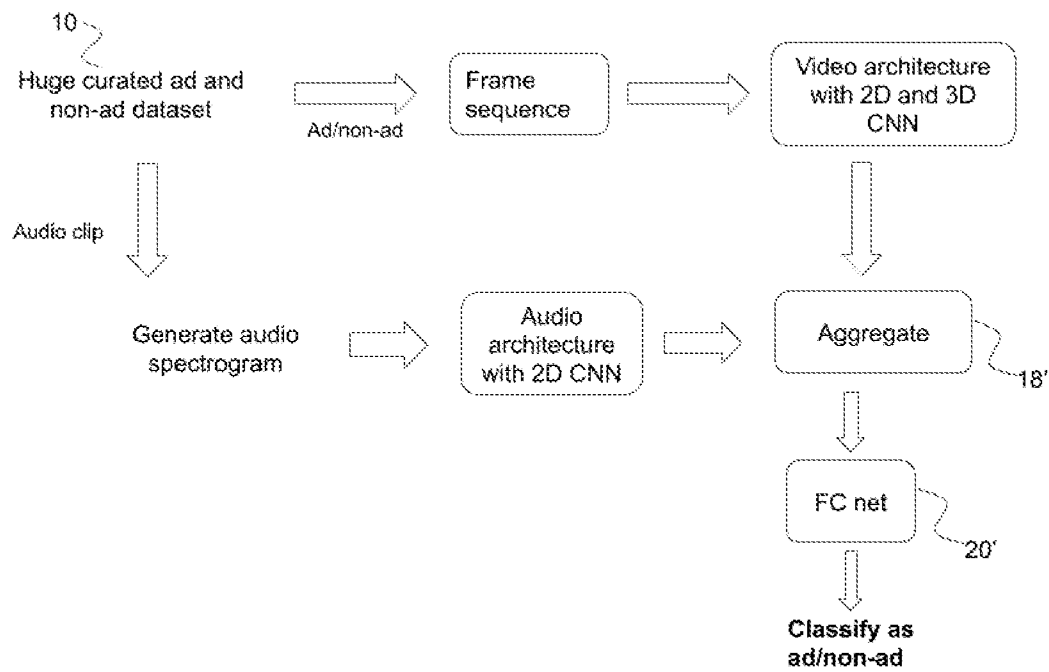
Fig. 4: Multi-modal audio-visual architecture

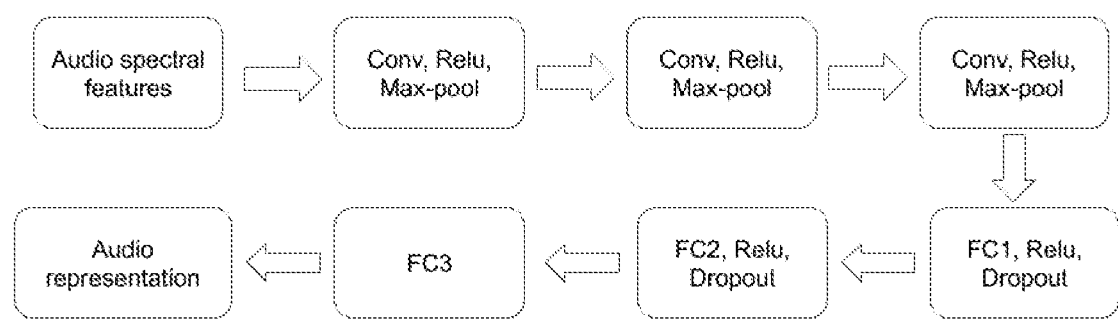
Fig. 5: Audio 2D CNN

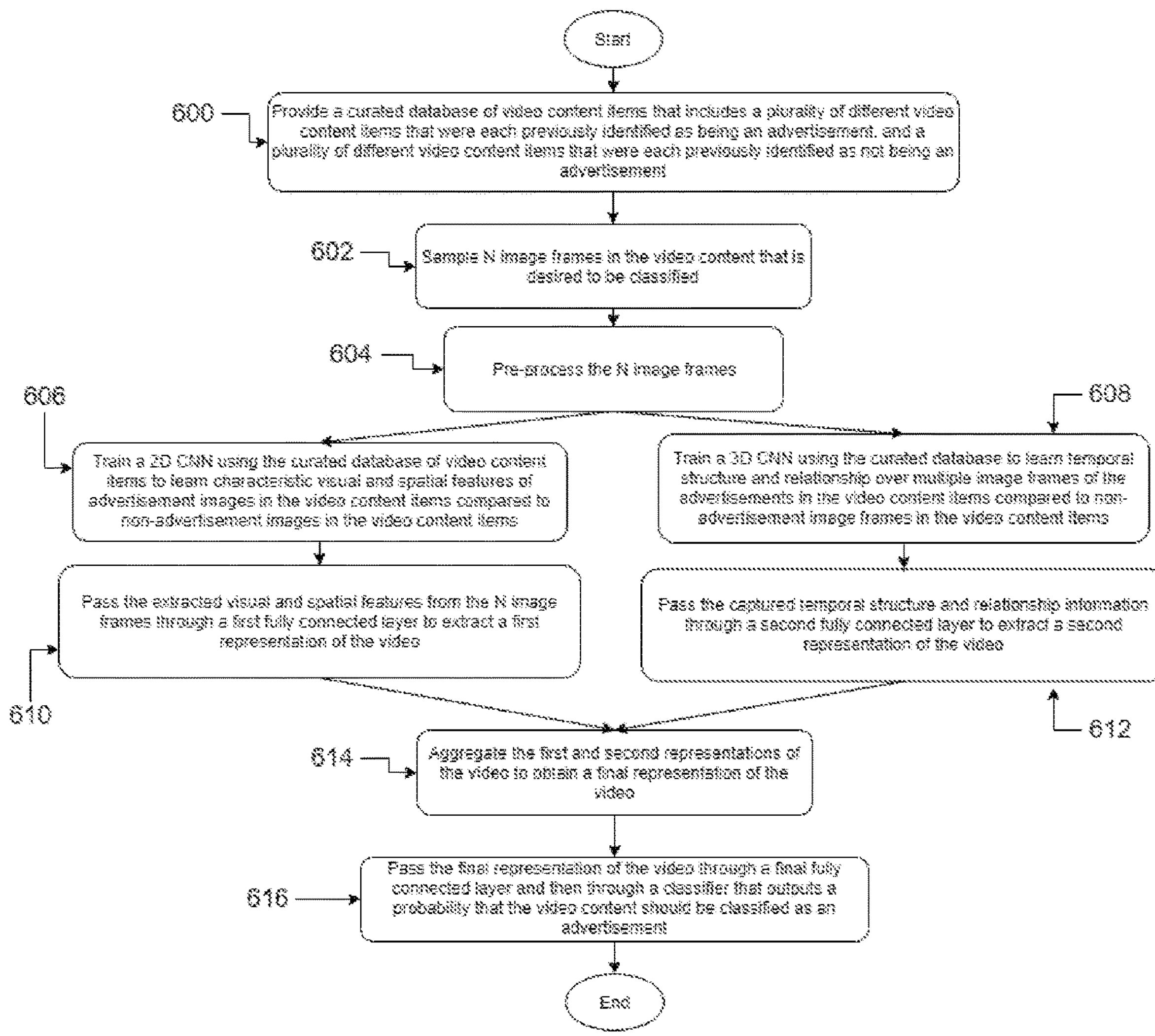
Fig. 6: Linear flowchart for video

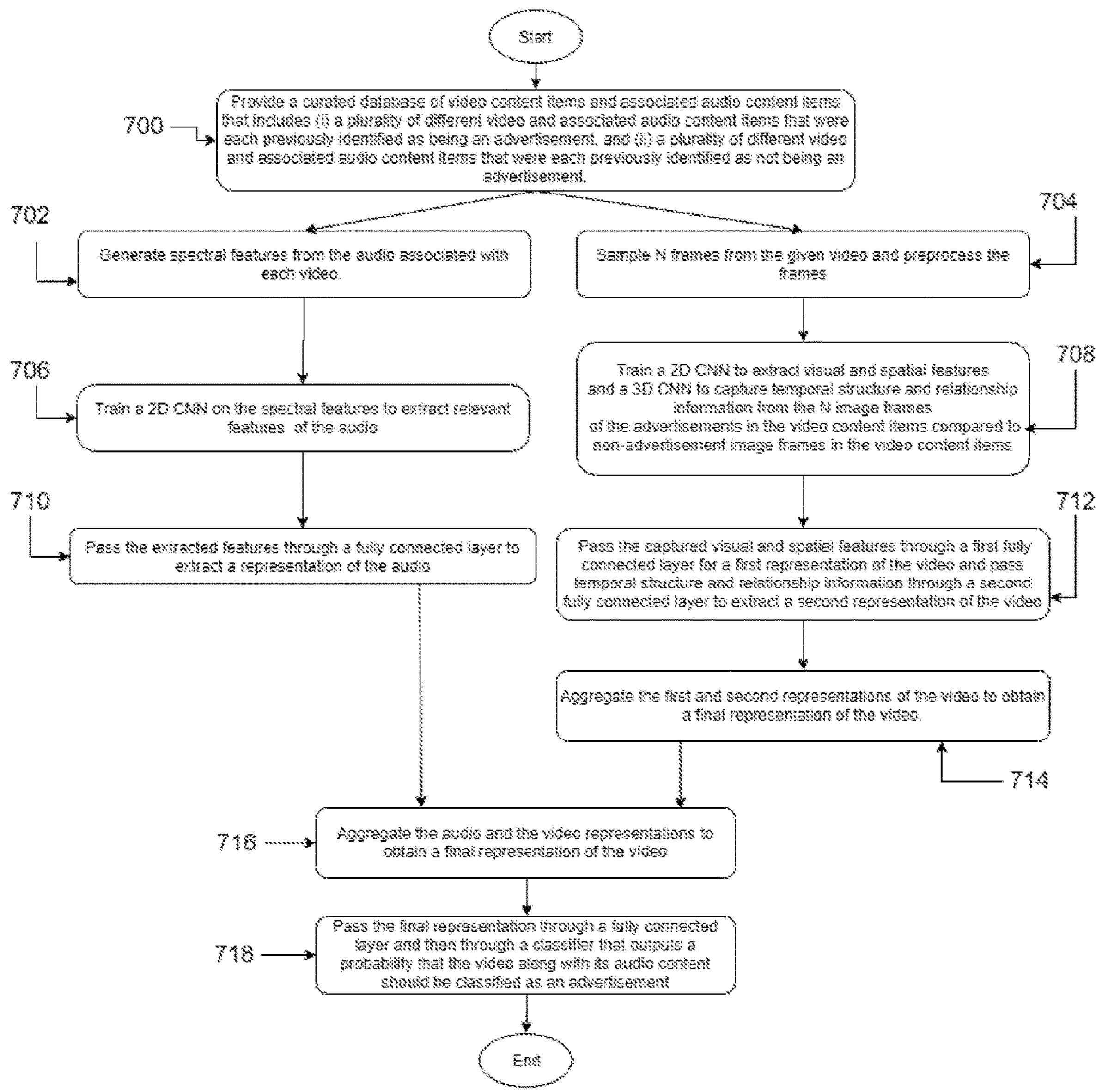
Fig. 7: Linear flowchart for aggregated audio and video

3D CONVOLUTIONAL NEURAL NETWORKS FOR TELEVISION ADVERTISEMENT DETECTION

CROSS-REFERENCE TO RELATED APPLICATIONS

This application claims priority to U.S. Provisional Patent Application No. 62/896,170 filed Sep. 5, 2019, which is incorporated by reference herein.

BACKGROUND OF THE INVENTION

Precise detection of advertisements (ads) in a video (TV) stream is of paramount importance for companies in the field of TV analytics and measurement, partly because it allows for accurate downstream analysis. Whether the task is to provide audience engagement, deeper insights into consumer behavior and attribution, or to solidify automated content recognition and categorization, accurate and automated ad detection is a very important first step.

Recent performance in activity recognition on the DeepMind Kinetics human action video dataset (Kinetics dataset) demonstrates that high accuracy (80%) at low computational cost can be achieved with 3D convolutional neural networks (CNNs) such as ResNet, Res3D, ArtNet, and others. Spatial features are extracted from individual frames in a temporal neighborhood efficiently with a 2D convolutional architecture. A 3D network then extracts the temporal context between these frames and can improve significantly over the belief obtained from individual frames, especially for complex long-term activities. Recently, variants of 3D CNNs have maintained the highest positions on the activity recognition leaderboard (www.actionrecognition.net).

The present invention uses these techniques for a completely new purpose, namely, for advertisement (ad) detection in a video stream, and more specifically, to perform ad vs non-ad classification.

SUMMARY OF THE PRESENT INVENTION

A method is provided to classify whether video content is likely to be an advertisement or a non-advertisement. A curated database of video content items that includes a plurality of different video content items that were each previously identified as being an advertisement, and a plurality of different video content items that were each previously identified as not being an advertisement, are used to train a 2D CNN and a 3D CNN. The training of the 2D CNN includes learning characteristic visual and spatial features of advertisement images in the video content items compared to non-advertisement images in the video content items, the training resulting in weights being defined for the 2D CNN. The training of the 3D CNN includes learning a temporal structure and relationship over multiple image frames of the advertisements in the video content items compared to non-advertisement image frames in the video content items, the training resulting in weights being defined for the 3D CNN. The trained 2D CNN and 3D CNN are then used to determine the probability that newly identified video content should be classified as an advertisement.

BRIEF DESCRIPTION OF THE DRAWINGS

Preferred embodiments of the present invention will now be described by way of example with reference to the accompanying drawings:

FIG. 1 illustrates system architecture for one preferred embodiment of the present invention.

FIG. 2-5 illustrate flow processes for preferred embodiments of the present invention.

FIGS. 6 and 7 illustrate flowcharts for preferred embodiments of the present invention.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

FIG. 1 shows ad detection architecture. A large (huge) dataset of curated ads and non-ads (TV video segments) are inputted into the system architecture. This large dataset of TV video segments is curated for training, validation, and testing. The selection and curation process involves creating a balanced dataset of ads and non-ads, and aims to maintain the true distribution within each class. Towards this goal, ads and non-ads are sampled from a wide variety of networks and channels so that the model could learn from diverse examples and generalize across networks. The samples were collected at different times of the day, across different shows and genres for several months. Better generalization means a classifier does well in any dataset and not just the one it is trained with. TV streams across different channels can have different resolution, average frame rate, video data rate, compression settings, and other variables. Sampling from multiple networks also ensures that the true distribution of ads with these different attributes is closely approximated.

The selection and curation process are performed so as to ensure that no systemic biases between ads and non-ads were prevalent, so that the model would be able to learn meaningful differences between the two classes. In order to do so, both ads and non-ads were collected from the same set of TV-stream/networks. That is, when some ads were collected from a particular TV-stream or channel, non-ads were also collected from the same source. This keeps the distribution of different attributes similar for both ads and non-ads. The samples were further curated within each channel so that the different genres, shows and content were adequately represented.

Samples collected were manually clipped and labeled as ads and non-ads and validated by different human members of a work team. For the training, frames were extracted from the clips and were pre-processed with data augmentation techniques such as cropping and jittering and were resized to be 528 pixels in width.

The model expects N frames sampled at semi-regular intervals from the video. The model divides the frames of the video into N segments 12 (either 8 or 16 or 32) and randomly chooses one frame from each segment to feed into the input layer of the model.

The model has two parallel streams, namely, a 2D CNN stream 14 and a 3D CNN stream 16 which are aggregated together 18 and passed through a fully connected layer (FC net) 20 and a classifier (not shown) which outputs the softmax probability of the clip being a non-ad or ad.

FIG. 2 illustrates flow processes for the 2D CNN stream 14 of FIG. 1. The 2D CNN stream learns the characteristic visual and spatial features of ad vs non-ad images. It includes multiple convolutional (Conv), Batch Normalization (Batch norm) and Relu layers. 5×5 convolutions are factorized to two 3×3 convolutions to improve speed.

FIG. 3 illustrates flow processes for the 3D CNN stream 16 of FIG. 2. The 3D CNN stream learns the temporal structure and relationship over multiple video frames. This architecture extends the 2D-Resnet architecture to 3D by changing the input from 224×224 to 8×112×112; changing all convolutions from d×d to 3×d×d with all downsampling convolution layers using stride 2×2×2 and removing the first max-pooling layer.

FIG. 4 shows system architecture for aggregating both audio and video features. The features from the audio and video networks are aggregated 18' and the final FC layer 20' and the classifier (not shown) use these features to make a prediction. The use of audio associated with the video improves on the ad detection accuracy.

FIG. 5 illustrates the CNN network used to generate features from an audio clip. The Audio 2D CNN architecture is a generic architecture that accepts input spectral images of shape (200×200) and outputs a (1×4096) feature. The first Convolution layer uses a kernel size of 5, the second and third use a kernel size of 3. The max-pool layers use a kernel size of 3. All layers use a stride of 2.

FIG. 6 is a flowchart in accordance with one preferred embodiment of the present invention, and includes the following steps:

Step 600: Provide a curated database of video content items that includes (i) a plurality of different video content items that were each previously identified as being an advertisement, and (ii) a plurality of different video content items that were each previously identified as not being an advertisement.

Step 602: Sample N image frames in video content that is desired to be classified. In one preferred embodiment, the N image frames are uniformly sampled using reservoir sampling. In another preferred embodiment, the N image frames are sampled by dividing the video content into segments and sampling one frame from each of the segments.

In one preferred embodiment, the sampling process may be implemented using programming based on the following pseudocode that samples 16 frames from a window of size x frames, and specifically one frame every [x/16] frames. Once the sampling is done, the next 16 frames are sampled from a window of size x frames that is p frames ahead of the previous window. "buffer" is a data structure used to aid in reservoir sampling where the frame number N is received in an online fashion.

```
Algorithm 1 Reservoir Sampling Driver
1: procedure RUN SAMPLING(x,p,buffer,frame,N)
2: x←Length of window determined apriori
3: p←Window stride determined apriori
4: buffer[x/p][16]←(x/p) arrays of length 16 frames
5: N←Current frame number (global numbering starting from 0)
6: frame←Current frame
7:
8: i←0
9: chunksize←[x/p]
10: while i<=chunksize do
11: n←(N−i*p)<0? (N−i*p):(N−i*p) % x
12: RESERVOIR (buffer[i],frame,n,chunksize)=0
Algorithm 2 Reservoir Sampling Helper
1: procedure RESERVOIR(arr,frame,n,chunksize)
2: arr[16]←Array to hold frames
3: frame←Current frame
4: n←Frame number for current window
5: chunksize←Size of each chunk within x to sample a single frame from
6:
7: if n<0 then return
8: if n==0 then
9: Feed arr into network
10:
11: chunknum←[n/chunksize]
12: k←randint(0,(n % chunksize))
13: if k==0 then
14: arr[chunknum]←frame
```

Other sampling techniques are within the scope of the present invention.

Step 604: Pre-process the N image frames. This step is not necessary, but is preferably performed so as to improve the quality of the data set. Examples of pre-processing include reshaping, cropping, jittering, or flipping the N image frames. Any number or sub-combination of these pre-processing techniques may be performed.

Step 606: Train a 2D CNN using the curated database of video content items. The training includes learning characteristic visual and spatial features of advertisement images in the video content items compared to non-advertisement images in the video content items. The training resulting in weights being defined for the 2D CNN.

Step 608: Train a 3D CNN using the curated database of video content items. The training includes learning a temporal structure and relationship over multiple image frames of the advertisements in the video content items compared to non-advertisement image frames in the video content items. The training results in weights being defined for the 3D CNN.

Step 610: Pass the extracted visual and spatial features from the N image frames through a first fully connected layer to extract a first representation of the video.

Step 612: Pass the captured temporal structure and relationship information through a second fully connected layer to extract a second representation of the video.

Step 114: Aggregate the first and second representations of the N image frame to obtain a final representation of the video.

Step 116: Pass the final representation of the video through a final fully connected layer and then through a classifier. The classifier outputs a probability that the video content should be classified as an advertisement. One example of a classifier that is suitable for use with the present invention is a softmax function that outputs a softmax probability. Another suitable classifier is a Support Vector Machine (SVM).

FIG. 7 is a flowchart in accordance with another preferred embodiment of the present invention that incorporates audio and video, and includes the following steps:

Step 700: Provide a curated database of video content items and associated audio content items that includes (i) a plurality of different video and associated audio content items that were each previously identified as being an advertisement, and (ii) a plurality of different video and associated audio content items that were each previously identified as not being an advertisement.

Step 702: Generate spectral features from the audio associated with each video. Spectral features are frequency-based features that contain useful information about the audio, such as pitch, timbre, and notes.

Step 704: Sample N frames from the given video and preprocess the frames. This step is similar steps 602 and 604 in FIG. 6.

Step 706: Train a 2D CNN on the spectral features to extract relevant features of the audio.

Step 708: Train a 2D CNN to extract visual and spatial features and a 3D CNN to capture temporal structure and relationship information from the N image frames of the advertisements in the video content items compared to non-advertisement image frames of the video content items.

Step 710: Pass the extracted features through a fully connected layer to extract a representation of the audio.

Step 712: Pass the captured visual and spatial features through a first fully connected layer for a first representation of the video, and pass temporal structure and relationship information through a second fully connected layer to extract a second representation of the video.

Step 714: Aggregate the first and second representation of the video to obtain a final representation of the video.

Step 716: Aggregate the audio representation from Step 701 and video representation from Step 714 to obtain a final representation.

Step 718: Pass the final representation through a fully connected layer, and then through a classifier that outputs a probability that the video along with its audio content should be classified as an advertisement.

In both the video and audio/video embodiments, any preprocessing and sampling techniques used in the training steps is also used in the test/deployment steps.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer implemented method for classifying whether video content is likely to be an advertisement, the video content including a plurality of image frames the method comprising:

(a) providing a curated database of video content items that includes (i) a plurality of different video content items that were each previously identified as being an advertisement, and (ii) a plurality of different video content items that were each previously identified as not being an advertisement;

(b) training a two-dimensional convolutional neural network (2D CNN) using the curated database of video content items, wherein the training includes learning characteristic visual and spatial features of advertisement images in the video content items compared to non-advertisement images in the video content items, the training resulting in weights being defined for the 2D CNN;

(c) training a three-dimensional convolutional neural network (3D CNN) using the curated database of video content items, wherein the training includes learning a temporal structure and relationship over multiple image frames of the advertisements in the video content items compared to non-advertisement image frames in the video content items, the training resulting in weights being defined for the 3D CNN;

(d) sampling N image frames in video content that is desired to be classified;

(e) using the trained 2D CNN to extract visual and spatial features from the N image frames, and passing the extracted visual and spatial features from the N image frames through a first fully connected layer to extract a first representation of the N image frames;

(f) using the trained 3D CNN to capture temporal structure and relationship information from the N image, frames, and passing the captured temporal structure and relationship information through a second fully connected layer to extract a second representation of the N image frames;

(g) aggregating the first and second representations of the N image frame to obtain a final representation of the N image frames; and (h) passing the final representation of the N image frames through a final fully connected layer and then through a classifier, the classifier outputting a probability that the video content is an advertisement.

2. The method of claim 1 wherein the classifier is a softmax function that outputs a softmax probability.

3. The method of claim 1 wherein the classifier is a Support Vector Machine (SVM).

4. The method of claim 1 wherein the N image frames are uniformly sampled using reservoir sampling.

5. The method of claim 1 wherein the N image frames are sampled by dividing the video content into segments and sampling one frame from each of the segments.

6. The method of claim 1 wherein the N image frames are pre-processed prior to steps (e) and (f), wherein the preprocessing includes reshaping the N image frames.

7. The method of claim 1 wherein the N image frames are pre-processed prior to steps (e) and (f), wherein the preprocessing includes cropping the N image frames.

8. The method of claim 1 wherein the N image frames are pre-processed prior to steps (e) and (f), wherein the preprocessing includes flipping the N image frames.

9. The method of claim 1 wherein the curated database of video content items further includes (iii) audio content items associated with the plurality of different video content items that were each previously identified as being an advertisement, and (iii) audio content items associated with the plurality of different video content items that were each previously identified as not being an advertisement, the method further comprising:

(i) generating spectral features from the audio content items associated with each of the different video content items;

(j) training another 2D CNN on the spectral features to extract relevant features of the audio content items;

(k) passing the extracted relevant features through another fully connected layer to extract a representation of the audio content items; and (l) prior to step (h), aggregating the representation of the audio content items and the final representation in step (g), wherein the final representation of the N image frames that is passed through the final fully connected layer and then through the classifier in step (h) is the aggregated representation in step (l), the classifier outputting a probability that the video content and its associated audio content is an advertisement.

* * * * *